May 8, 1951            A. DITTO            2,552,410

OPHTHALMIC MOUNTING

Filed Feb. 16, 1948

Inventor
Arthur Ditto
by David Rines
Attorney

Patented May 8, 1951

2,552,410

UNITED STATES PATENT OFFICE 2,552,410

OPHTHALMIC MOUNTING

Arthur Ditto, Roslindale, Mass., assignor, by mesne assignments, to Marine Optical Manufacturing Co., a corporation of Massachusetts Application February 16, 1948, Serial No. 8,608

5 Claims. (Cl. 88—53)

The present invention relates to ophthalmic mountings, and more particularly to the hinge connections between the fronts and the temples of ophthalmic mountings of the non-metal type. The invention has particular application to hinge connections of the type where the front is provided with temple-connecting end pieces that are curved.

Hinge connections of the above-described character have been a source of continual trouble to the industry. Since the curved end pieces are made by bending the non-metal material out of the plane of the non-metal sheet from which the fronts are manufactured, and since this non-metal material is usually a nitrocellulose or similar plastic, like "Celluloid" or "Zylonite," that tends to return to its original state after deformation, it is desirable to provide a reinforce for holding the curved end piece in its curved shape. The presence of this reinforce, usually of metal, however, tends to detract from the pleasing appearance of the mounting. With non-metal material darkly colored, it has been possible to conceal the metal reinforce by embedding it in the end piece. With light-colored or transparent non-metal materials, however, it is not possible to conceal the metal reinforce.

An object of the present invention, therefore, is to provide a new and improved ophthalmic mounting of the above-described character the metal reinforce of which, far from detracting from the appearance, shall, on the contrary, tend to enhance it.

Another object is to provide an ophthalmic mounting of the above-described character the hinge connections of which, besides presenting a pleasing appearance, shall not loosen, even after continued use.

Other and further objects will be explained hereinafter and will be particularly pointed out in the appended claims.

Figure 1:
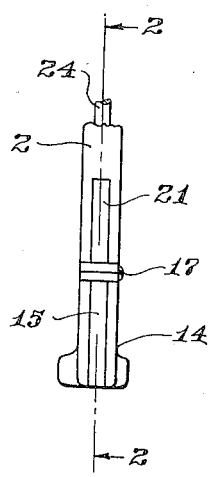
Figure 2:
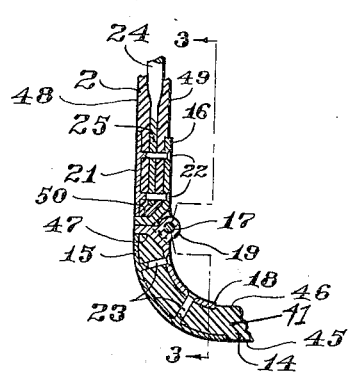
Figure 3:
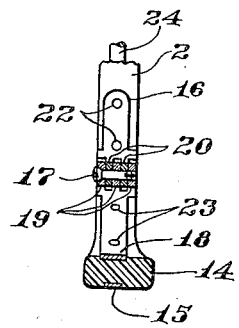
Figure 4:
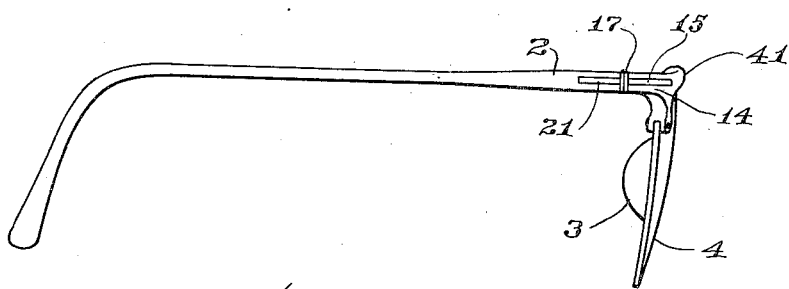

The invention will now be more fully described in connection with the accompanying drawings, in which Fig. 1 is a fragmentary end elevation of an ophthalmic mounting constructed according to a preferred embodiment of the present invention; Fig. 2 is a section taken upon the line 2—2 of Fig. 1, looking in the direction of the arrows; Fig. 3 is a section taken upon the line 3—3 of Fig. 2, looking in the direction of the arrows; and Fig. 4 is a side elevation of an ophthalmic mounting embodying the present invention.

The ophthalmic mounting may embody a front comprising a bridge member, not shown, and two lens-holding members 41, each terminating at its outer end in a curved temple-connecting end piece 14. The mounting comprises also non-metal temples 2. The non-metal material may be constituted of nitrocellulose products known as "Zylonite" and "Celluloid," a compound of pyroxylin, camphor and alcohol. It may, however, be constituted also of any other suitable plastic, such as nylon plastic, cellulose acetate or a plasticized vinyl resin polymer obtained, for example, by polymerizing one or more vinyl derivatives. The attractiveness of the mounting may be increased by having the non-metal material transparent, and either colored or uncolored.

The curves in the end pieces 14 may be produced by suitable bending under pressure and heat. Each end piece 14 is provided with a front face 45, a rear face 46, and an end face 47. Each temple is provided with a front face 48, a rear face 49, and an end face 50, respectively corresponding to the corresponding faces 45, 46 and 47 of the curved end pieces 14. A metal hinge is provided for connecting each temple 2 to one of the end pieces 14.

According to the preferred embodiment of the present invention, each hinge comprises two pivoted L-shaped metal members 16 and 18, the former for securing to one of the temples 2 and the latter for securing to one of the curved end pieces 14. The long arm of each L-shaped member 18 is curved to conform to the curve of the rear face 46 of the end piece 14. The short arm of each L-shaped member 16 and 18 is respectively of dimensions conforming substantially to the dimensions of the end face 50 of the end of the temple 2 and the end face 47 of the end piece 14. The long curved arm of each L-shaped member 18 is disposed adjacent to the rear face 46 of the curved end piece 14. The long arm of each L-shaped member 16 is disposed adjacent to the rear face 49 of one of the temples 2. The short arm of each L-shaped member 16 is disposed adjacent to the end face 50 of one of the temples 2 and the short arm of each L-shaped member 18 is disposed adjacent to the end face 47 of one of the curved end pieces 14. Two elongated curved metal members 15 are curved to conform to the shape of the front faces 45 of the curved end pieces 14 and two elongated metal members 21 are similarly provided for the front faces 48 of the temples 2. The elongated metal members 15 and 21 are narrower than the arms of the L-shaped members 16 and 18, and they are disposed centrally adjacent to the respective front faces 45 and 48 and in abutting relation to the short arms of the L-shaped members 16 and 18. The metal members 15, 16, 18 and 21 are set into recesses in the non-metal material, substantially flush with the respective front faces 45 and 48 and the respective rear faces 46 and 49.

The metal members 15 are each shown respectively provided integrally with two rivet pins 23 extending through the end pieces 14 and riveted at two positions into the long arms 18 to secure the respective metal members 15 to the respective end pieces 14. The curved end pieces 14 are thus mounted between the correspondingly curved metal members 15 and 18, with the rivet pins 23 extending integrally from the front parts 15 through the end pieces 14 and into the rear parts 18. The front ends of the non-metal temples 2 are held similarly between similar metal members 21 and 16, respectively corresponding to the parts 15 and 18, but straight instead of curved. Two rivet pins 22, integral with each of the metal members 21, are shown extending not only through the non-metal material of the temples 2, but also through the flattened ends 25 of reinforcing wires 24 for the temples 2, and riveted at two positions into the parts 16. The short arms of the L-shaped members 16 and 18 serve as abutting members for the hinges. The hinging is effected by extending a pintle 17 through interengaging perforated ears 20 and 19 of the parts 16 and 18.

Modifications will occur to persons skilled in the art, and all such are considered to fall within the spirit and scope of the present invention, as defined in the appended claims.

What is claimed is:

1. In an ophthalmic mounting comprising two pivoted members, namely, a lens-holding member and a temple, one of which is provided with a non-metal end portion having a front face, a rear face and an end face, a hinge for pivotally connecting the temple to the lens-holding member comprising an L-shaped metal hinge member one of the arms of which is longer than the other arm, the shorter arm being of dimensions conforming substantially to the dimensions of the end face, the L-shaped metal hinge member being mounted with its longer arm set into the non-metal end portion substantially flush with the rear face and with its shorter arm disposed adjacent to the end face, and an elongated metal member narrower than the arms set into the non-metal end portion centrally of and substantially flush with the front face in abutting relation to the shorter arm and integrally provided with rivet pins extending through the non-metal end portion and riveted at a plurality of positions into the longer arm to secure the L-shaped metal hinge member and the elongated metal member to the non-metal end portion.

2. A temple for an ophthalmic mounting provided with a non-metal end portion having a front face, a rear face and an end face, a hinge for pivotally connecting the temple to the lens-holding member of the ophthalmic mounting comprising an L-shaped metal hinge member one of the arms of which is longer than the other arm, the shorter arm being of dimensions conforming substantially to the dimensions of the end face, the L-shaped metal hinge member being mounted with its longer arm set into the non-metal end portion substantially flush with the rear face and with its shorter arm disposed adjacent to the end face, and an elongated metal member narrower than the arms set into the non-metal end portion centrally of and substantially flush with the front face in abutting relation to the shorter arm and integrally provided with rivet pins extending through the non-metal end portion and riveted at a plurality of positions into the longer arm to secure the L-shaped metal hinge member and the elongated metal member to the non-metal end portion.

3. A lens-holding member for an ophthalmic mounting provided with a curved temple-connecting non-metal end piece having a front face, a rear face and an end face, a hinge for pivotally connecting a temple to the lens-holding member comprising an L-shaped metal hinge member one of the arms of which is longer than the other arm, the longer arm being curved to conform to the curve of the rear face, the shorter arm being of dimensions conforming substantially to the dimensions of the end face, the L-shaped metal hinge member being mounted with its longer arm set into the non-metal end piece substantially flush with the rear face and with its shorter arm disposed adjacent to the end face, and an elongated metal member curved to conform to the curve of the front face and narrower than the arms set into the non-metal end piece centrally of and substantially flush with the front face in abutting relation to the shorter arm and integrally provided with rivet pins extending through the non-metal end piece and riveted at a plurality of positions into the longer arm to secure the L-shaped metal hinge member and the elongated metal member to the non-metal end piece.

4. In an ophthalmic mounting comprising two pivoted members, namely, a lens-holding member and a temple, each provided with a non-metal end portion having a front face, a rear face and an end face, a hinge for pivotally connecting the temple to the lens-holding member comprising two pivoted L-shaped metal hinge members one of the arms of each of which is longer than the other arm, the shorter arms being of dimensions conforming substantially to the dimensions of the respective end faces, the L-shaped metal hinge members being mounted with their longer arms set into the respective non-metal end portions substantially flush with the rear faces of the respective non-metal end portions and with their shorter arms disposed adjacent to the end faces of the respective non-metal end portions, and two elongated metal members narrower than the arms set into the respective non-metal end portions centrally of and substantially flush with the front faces in abutting relation to the respective shorter arms and respectively integrally provided with rivet pins extending through the respective non-metal end portions and riveted at a plurality of positions into the respective longer arms to secure the respective L-shaped metal hinge members and the respective elongated metal members to the respective non-metal end portions, the shorter arms serving as abutting members for the hinge.

5. An ophthalmic mounting comprising a non-metal front having a bridge and lens-holding members each having a curved temple-connecting end piece having a front face, a rear face and an end face, a pair of temples each having front and rear faces and an end face, and a hinge for pivotally connecting each temple to one of the end pieces comprising two pivoted L-shaped metal hinge members one of the arms of each of which is longer than the other arm, the longer arms of the L-shaped members for the curved end pieces being curved to conform to the curves of the respective rear faces of the respective end pieces, the shorter arms of the L-shaped members being of dimensions conforming substantially to the dimensions of the respective end faces, one of the L-shaped metal hinge members of each hinge being mounted upon one of the end pieces and the other L-shaped metal hinge member of each hinge being mounted upon one of the temples with the longer arms set into the respective end pieces and temples substantially flush with the respective rear faces of the respective end pieces and temples and with their respective shorter arms disposed adjacent to the respective end faces of the respective end pieces and temples, and four elongated metal members narrower than the arms set into the respective end pieces and temples centrally of and substantially flush with the respective front faces of the respective end pieces and temples in abutting relation to the respective shorter arms of the respective L-shaped metal hinge members mounted upon the respective end pieces and temples and respectively integrally provided with rivet pins extending through the respective end pieces and temples and riveted at a plurality of positions into the respective longer arms of the L-shaped metal hinge members to secure the respective L-shaped metal hinge members and the respective elongated metal members to the respective nonmetal end pieces and the respective temples, the shorter arms serving as abutting members for the respective hinges.

ARTHUR DITTO.

REFERENCES CITED

The following references are of record in the file of this patent:

UNITED STATES PATENTS

| Number | Name | Date |
|---|---|---|
| 1,609,902 | Bontelle | Dec. 7, 1926 |
| 1,987,206 | Nerney | Jan. 8, 1935 |
| 2,474,119 | Rohrbach | June 21, 1945 |

FOREIGN PATENTS

| Number | Country | Date |
|---|---|---|
| 312,398 | Italy | Nov. 13, 1933 |
| 788,230 | France | July 22, 1935 |
| 331,094 | Italy | Oct. 29, 1935 |
| 438,946 | Great Britain | Nov. 26, 1935 |
| 812,322 | France | Feb. 1, 1937 |
| 540,883 | Great Britain | Nov. 4, 1941 |